(12) United States Patent
Davis et al.

(10) Patent No.: US 6,904,817 B2
(45) Date of Patent: Jun. 14, 2005

(54) METHOD AND APPARATUS FOR EXAMINING OBSTRUCTED WELDS

(75) Inventors: Trevor James Davis, Charlotte, NC (US); David Galbally, Huntersville, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/065,616

(22) Filed: Nov. 4, 2002

(65) Prior Publication Data

US 2004/0083828 A1 May 6, 2004

(51) Int. Cl.⁷ ............................................. G01M 19/00
(52) U.S. Cl. ..................... 73/865.8; 73/866.5; 73/622; 73/623; 73/633
(58) Field of Search .............. 73/865.8, 866.5, 73/622, 623, 633

(56) References Cited

U.S. PATENT DOCUMENTS

| | | | | |
|---|---|---|---|---|
| 3,602,036 A | * | 8/1971 | Peterson ..................... | 73/633 |
| 4,548,785 A | * | 10/1985 | Richardson et al. ........ | 376/249 |
| 4,718,277 A | * | 1/1988 | Glascock ..................... | 73/622 |
| 4,744,251 A | * | 5/1988 | Shirasu et al. ................ | 73/622 |
| 4,893,512 A | * | 1/1990 | Tanimoto et al. ............. | 73/622 |
| 5,009,105 A | * | 4/1991 | Richardson et al. .......... | 73/621 |
| 5,515,589 A | | 5/1996 | Kazirskis et al. | |
| 5,535,628 A | * | 7/1996 | Rutherford ................... | 73/622 |
| 5,568,527 A | | 10/1996 | Richardson et al. | |
| 5,586,155 A | | 12/1996 | Erbes et al. | |
| 5,784,425 A | * | 7/1998 | Morlan ........................ | 73/640 |
| 5,982,839 A | * | 11/1999 | Hatley .......................... | 73/622 |
| 6,137,853 A | * | 10/2000 | Duckering et al. ......... | 376/252 |
| 6,332,011 B1 | | 12/2001 | Johnson | |

* cited by examiner

*Primary Examiner*—Hezron Williams
*Assistant Examiner*—André K. Jackson
(74) *Attorney, Agent, or Firm*—Harness, Dickey & Pierce, P.L.C.

(57) ABSTRACT

A method and apparatus is provided for inspecting a series of obstructed welds, such as those used in attaching the jet pump diffuser to a baffle plate using a jet pump adapter within a boiling water nuclear reactor (BWR). The apparatus comprises a support, a frame with holding mechanisms, a connector, a carrier and a sensor assembly and the method can comprise positioning the apparatus so that it partially surrounds the jet pump near the baffle plate attachment region and is temporarily held in place. The sensor assembly then positions a sensor adjacent an area of interest and the carrier is rotated along the frame to scan the sensor along the surface being inspected to acquire data regarding the quality or nature of the material, such as the quality of a weld.

20 Claims, 14 Drawing Sheets

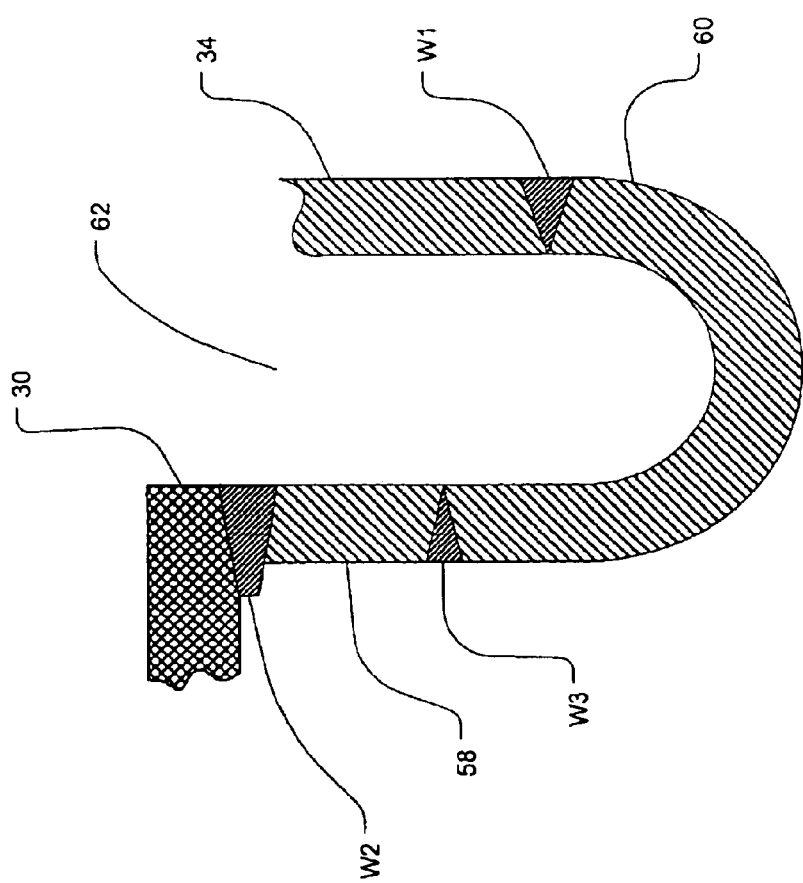

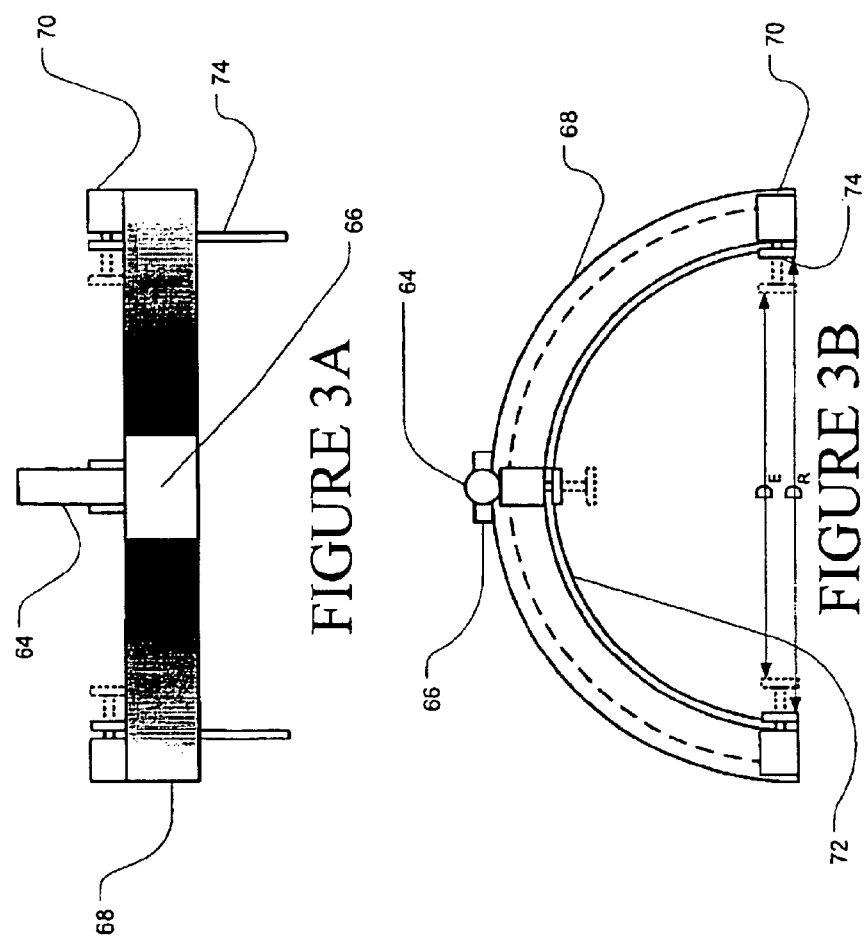

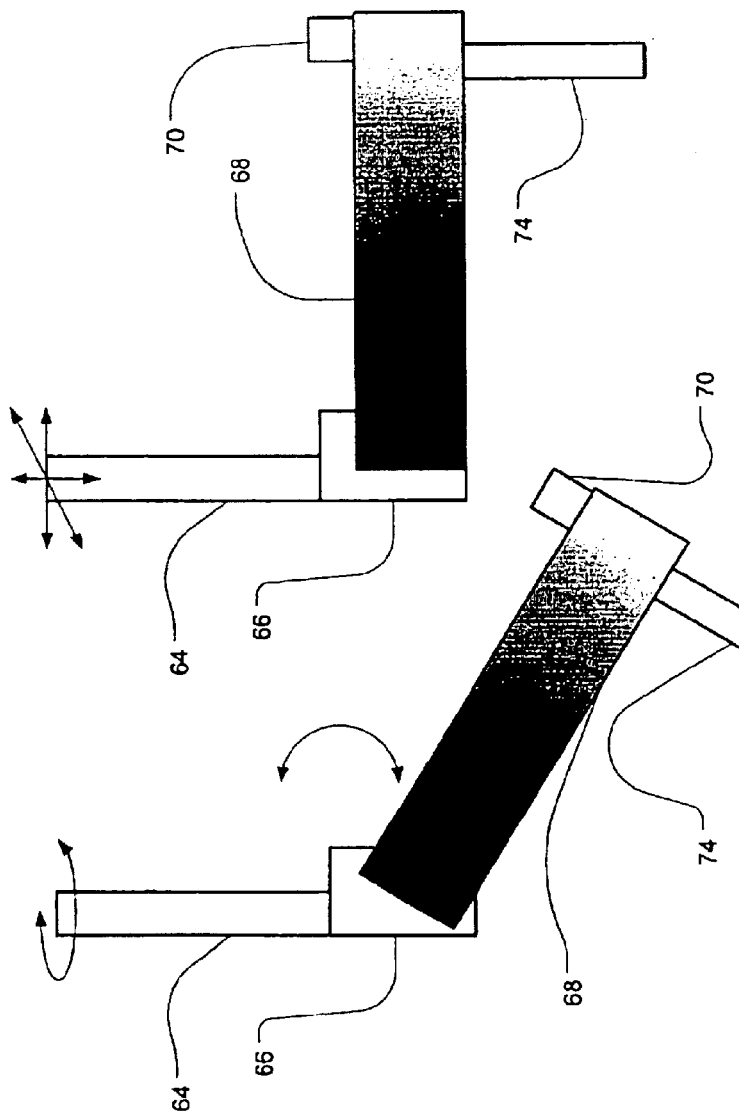

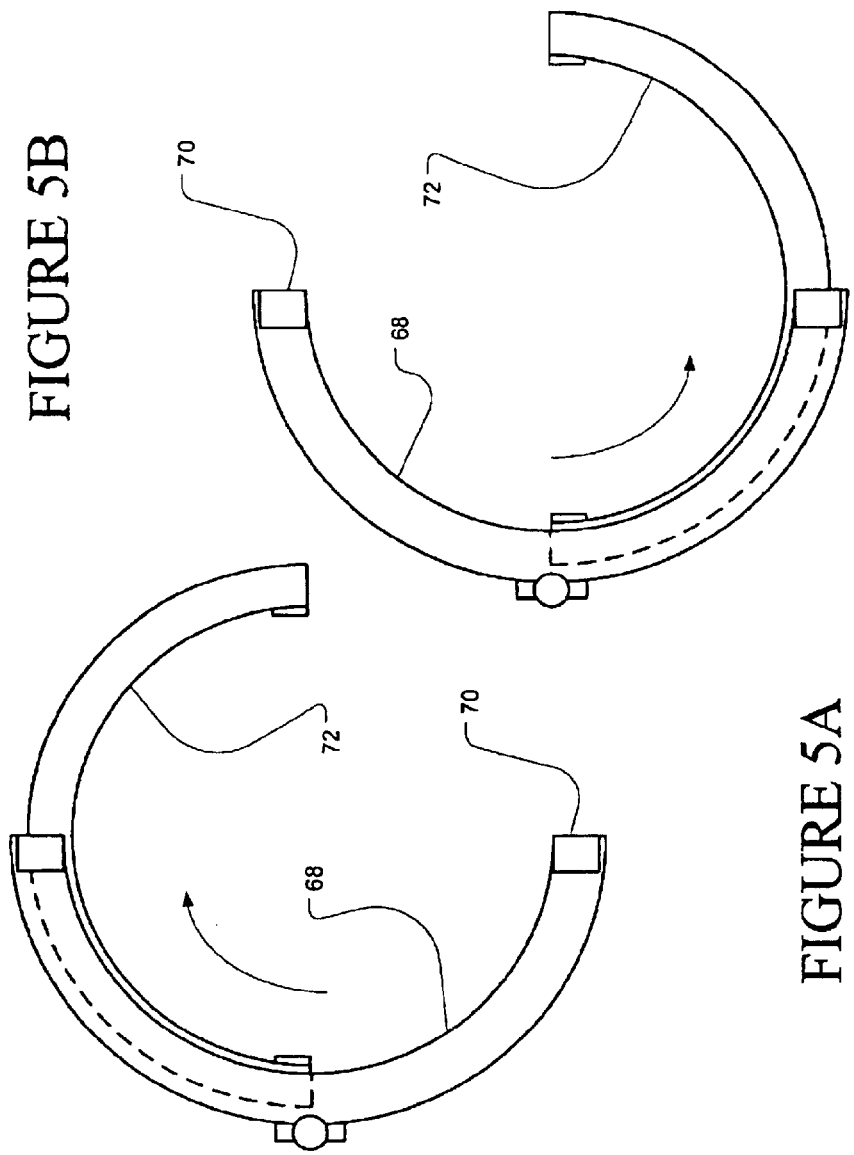

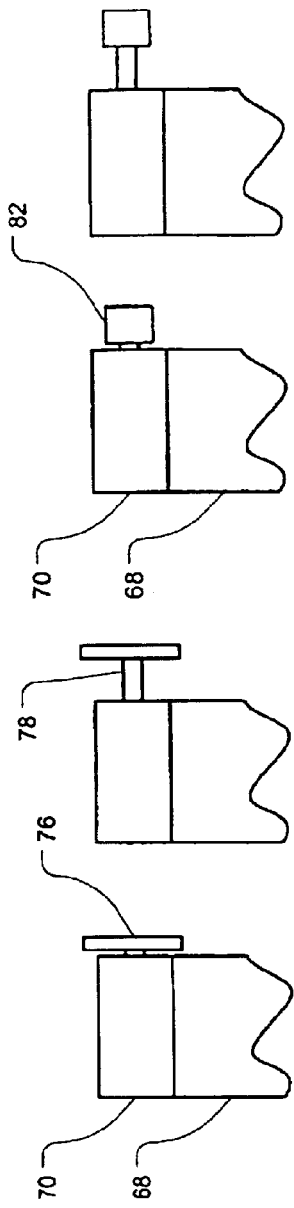
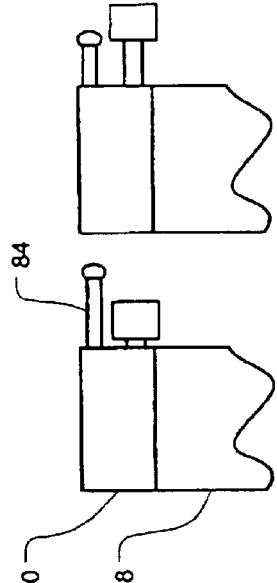
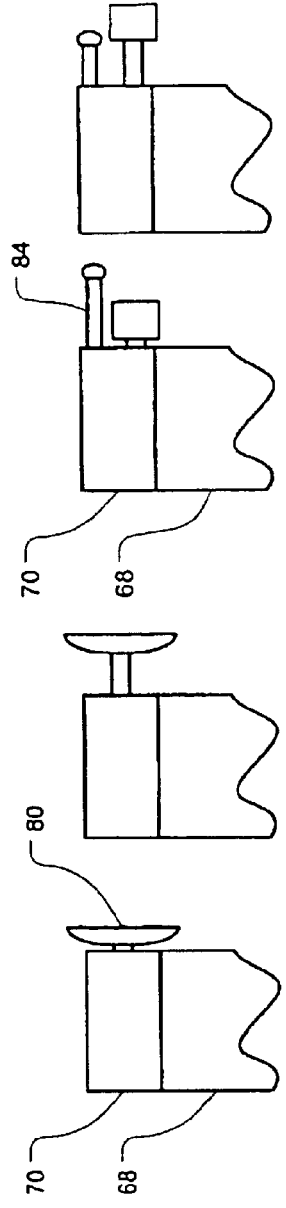
FIGURE 6A
FIGURE 6B
FIGURE 6C
FIGURE 6D

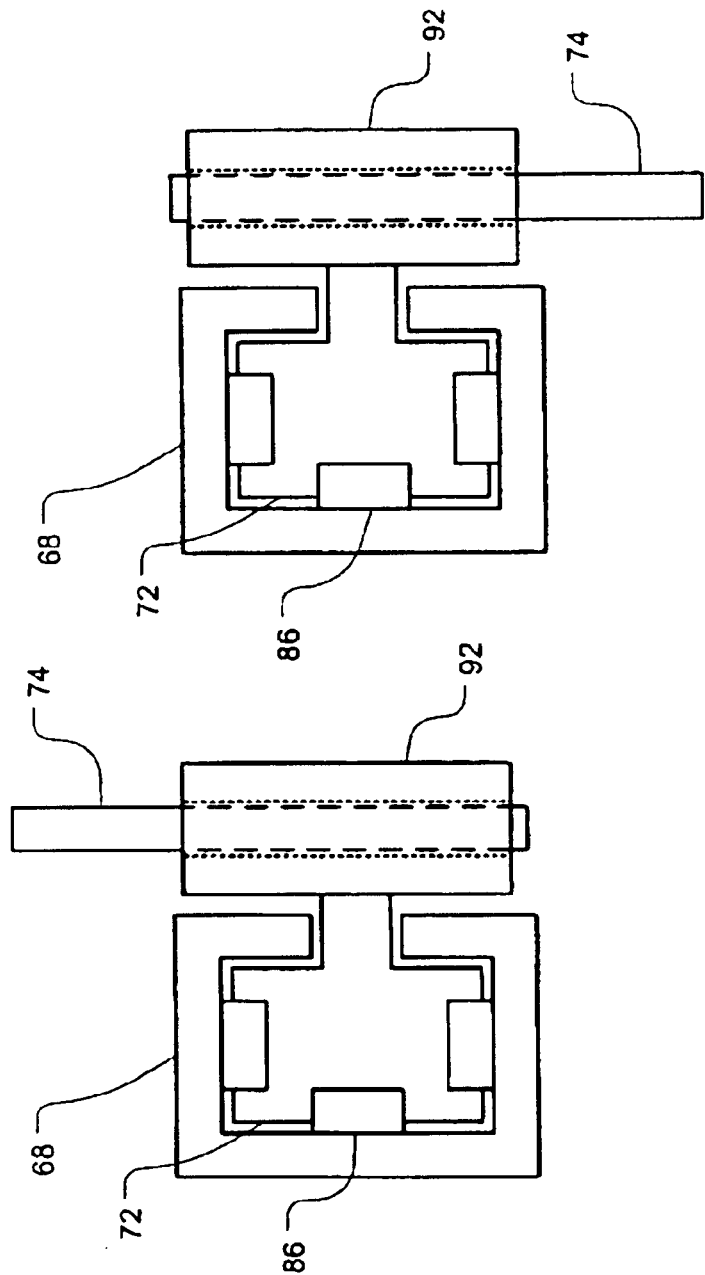

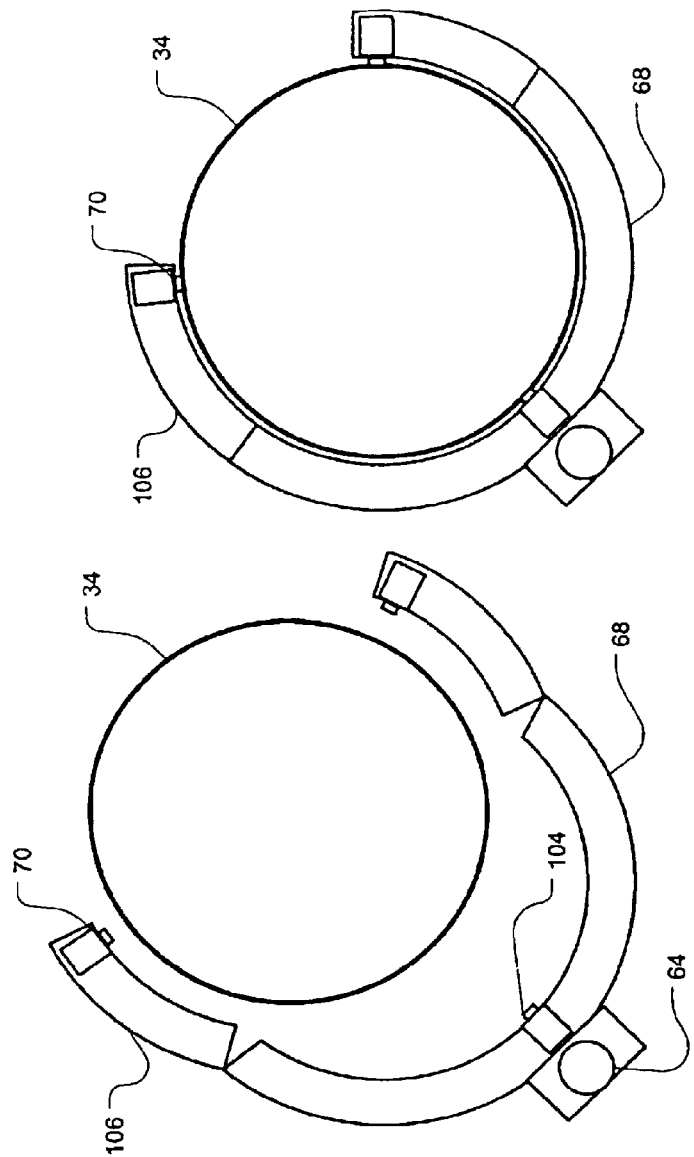

METHOD AND APPARATUS FOR EXAMINING OBSTRUCTED WELDS

BACKGROUND OF THE INVENTION

This invention relates generally to the in situ and non-destructive examination of circumferential surfaces, particularly including welds, and more particularly, obstructed welds. Such surfaces and welds may be found in boiling water nuclear reactors and are particularly associated with the attachment of jet pump diffusers to a baffle plate.

A reactor pressure vessel (RPV) of a boiling water reactor (BWR) typically has a generally cylindrical shape and is closed at both ends, e.g., by a bottom head and a removable top head. A top guide, sometimes referred to as a grid, is spaced above a core plate within the RPV. A core shroud, or shroud, surrounds the core plate and is supported by a shroud support structure. The core shroud is a reactor coolant flow partition and structural support for the core components. Particularly, the shroud has a generally cylindrical shape and surrounds both the core plate and the top guide. A removable shroud head is coupled to a shroud head flange at the top of the shroud.

A series of jet pump diffusers are typically arranged around the periphery of shroud and attached to a baffle plate (or pump deck) arranged between the shroud support structure and the inner wall of the RPV. In many cases, an adapter ring is provided to ensure a proper fit between the jet pump and the baffle plate, with the various components being fastened with a series of circumferential welds. During operation of the reactor, however, the circumferential weld joints may experience intergranular stress corrosion cracking (IGSCC) and irradiation-assisted stress corrosion cracking (IASCC) in weld heat affected zones which can diminish the structural integrity of the jet pump attachment. In particular, lateral seismic/dynamic loading could cause relative displacements at cracked weld locations may produce leakage and misalignment of the core that could comprise the performance of the jet pumps. Given the complex configuration of the attachment between the jet pump and the baffle plate, however, in situ examination of the welds has proven very difficult.

It is desirable, therefore, to provide an apparatus and a corresponding method for inspecting the welds used to attach the jet pump diffuser, the jet pump adapter and the baffle plate that is reliable and is capable of examining the majority of the circumference of at least two circumferential welds without the need for repositioning. When using ultrasonic sensors to examine a weld, the focus point of the ultrasonic beam may be adjusted so that the focal point of the beam aligns with an upper fusion line of the weld and the outer surface of the jet pump tail pipe or the jet pump adapter. The ultrasonic beam may then be repeatedly refocused to move the focal point along the weld fusion line from the outer surface toward the inner surface in discrete increments of about 0.01 to about 0.5 inch. One method for such incremental scanning is disclosed in U.S. Pat. No. 6,332,011, the contents of which are hereby incorporated by reference.

A variety of mechanisms have been devised for the examination of welds, particularly for use in hostile environments such as the interior of RPVs. One such apparatus is disclosed in U.S. Pat. No. 5,568,527, the contents of which are hereby incorporated by reference, and provides a remotely operated apparatus with clamping, sliding, rotational and sensor mechanisms to scan an ultrasonic transducer over specific core spray "T-box" welds including the T-box to cover plate attachment the T-box to thermal sleeve attachment welds.

BRIEF SUMMARY OF THE INVENTION

In an exemplary embodiment, an apparatus is provided for inspecting a series of welds used in attaching the jet pump diffuser, the jet pump adapter and the baffle plate comprising a support, a frame with integral holding means, a connector, a carrier and a sensor. In an exemplary embodiment, the disclosed apparatus is positioned on the baffle plate and partially surrounding the jet pump baffle plate attachment region and is temporarily held in place. The carrier then moves along the frame to scan one or more sensors along the welds to acquire data regarding the quality of the weld.

BRIEF DESCRIPTION OF THE DRAWINGS

FIG. 2 is an enlarged cross-sectional view of the jet pump to baffle plate attachment showing three distinct welds.

FIGS. 3A and 3B are side and plan views of the basic components in a preferred embodiment of the invention.

FIGS. 4A and 4B illustrate the range of motion of the support and the frame in a preferred embodiment of the invention.

FIGS. 5A and 5B illustrate the range of motion of the carrier relative to the frame in a preferred embodiment of the invention.

FIGS. 6A–6D illustrate some alternative configurations for the holding mechanism.

FIGS. 8A and 8B illustrate a configuration for the sensor assembly that provides a range of vertical movement for the sensor head that allows it to be placed in a retracted and/or shielded position during movement and an extended measurement position once the frame is in position.

FIGS. 13A and 13B illustrate an alternative embodiment of the frame mechanism in which moveable end portions are provided to increase the effective opening width of the frame.

DETAILED DESCRIPTION OF THE INVENTION

Figure 1:
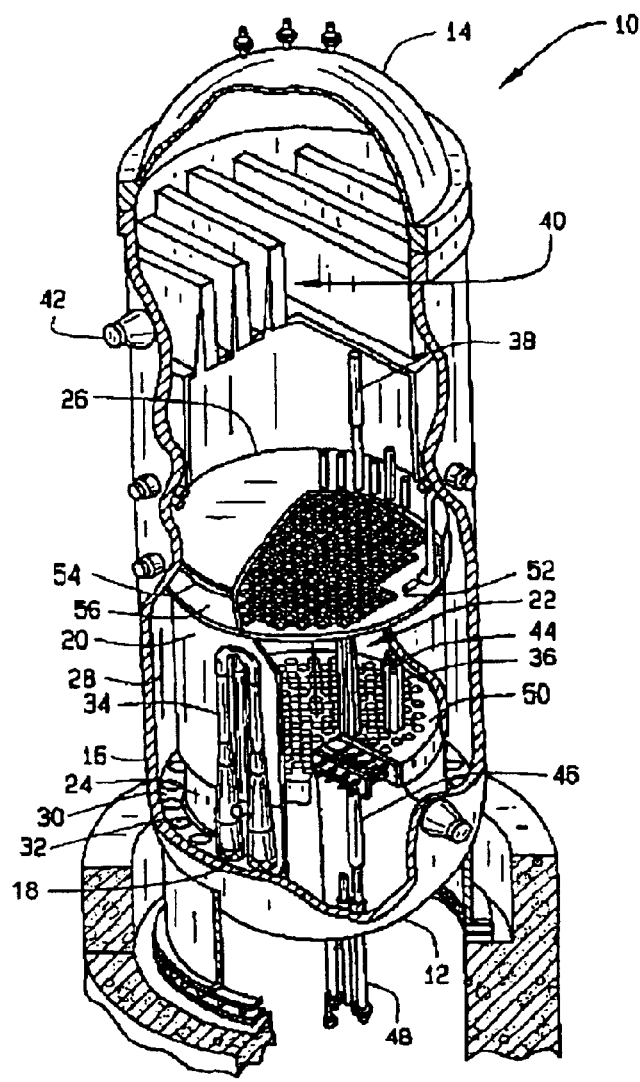
FIG. 1 is a sectional view, with certain parts partially or completely removed, of a typical boiling water nuclear reactor (BWR) pressure vessel.

FIG. 1 is a sectional view, with certain parts partially or completely removed, of a boiling water nuclear reactor (BWR) pressure vessel (RPV) 10. RPV 10 has a generally cylindrical shape and is closed at one end by a bottom head 12 and at its other end by a removable top head 14. A side wall 16 extends from bottom head 12 to top head 14. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A ring-shaped baffle plate (or pump deck) 30 extends between shroud support 24 and RPV side wall 16. Baffle plate 30 includes a plurality of circular openings 32, with each opening housing a jet pump assembly 34. Jet pump assemblies 34 are circumferentially distributed around core shroud 20 and are attached to the baffle plate with a jet pump adapter.

Heat is generated within core 22, which includes fuel bundles 36 of fissionable material. Water circulated up through core 22 is at least partially converted to steam. Steam separators 38 separate steam from water, which is recirculated. Residual water is removed from the steam by steam dryers 40. The steam exits RPV 10 through a steam outlet 42 near vessel top head 14.

The amount of heat generated in core 22 is regulated by inserting and withdrawing control rods 44 of neutron absorbing material, such as for example, hafnium. To the extent that control rod 44 is inserted into fuel bundle 36, it absorbs neutrons that would otherwise be available to promote the chain reaction which generates heat in core 22. Control rod guide tubes 46 maintain the vertical motion of control rods 44 during insertion and withdrawal. Control rod drives 48 effect the insertion and withdrawal of control rods 44. Control rod drives 48 extend through bottom head 12. Fuel bundles 36 are aligned by a core plate 50 located at the base of core 22. A top guide 52 aligns fuel bundles 36 as they are lowered into core 22. Core plate 50 and top guide 52 are supported by core shroud 20.

Welds between jet pump diffusers and the baffle plate encompass a variety of different "standard" configurations depending on the particular generation of BWR, the equipment vendor and the contractor. In certain BWR installations, each jet pump diffuser is welded to the bottom surface of the baffle plate using a transition piece called a "Jet Pump Adapter."

FIG. 2 is an enlarged sectional view of one configuration of the attachment between the jet pump diffuser 34, the baffle plate 30 and the jet pump adapter 18. In the illustrated embodiment, a series of circumferential welds W1, W2, W3 are used to form the attachment. A first weld W1 is used to attach the jet pump diffuser tail pipe to a lower adapter ring 60, a second weld W2 is used to attach an upper adapter ring 58 to the baffle plate and a third weld W3 is used to attach the upper and lower adapter rings to form the jet pump adapter 18.

As illustrated in FIG. 2, welds W1 and W2 are field welds, i.e., welds made during the on-site installation of the jet pump diffusers, that need to be inspected as part of the overall assessment of the structural integrity of the BWR. Weld W3, however, is typically completed during manufacture of the jet pump adapter in a controlled shop environment so the initial inspections are more easily conducted. After installation, however, the W3 weld must still be inspected periodically.

A small annular space 62 is formed between the jet pump diffuser tailpipe and the adapter, hampering access to the three welds. Indeed, in typical installations, the small annular space may be as narrow as 0.625 inch (about 16 mm), rendering the necessary inspection of the welds a serious challenge. As shown in FIG. 2, the annular space 62 has both a depth and a width, i.e., the spacing between opposing walls formed by the jet pump diffuser 34, the lower adapter ring 60 and the upper adapter ring 58, and may be further characterized by depth to width ratio.

FIGS. 3A and 3B illustrate the basic components of an apparatus according to the present invention. A support 64 is attached to a generally arcuate frame 68 by a connector 66. Provided on the frame are at least two holding mechanisms 70 that will be used to attach the frame to objects having a dimension of less that the spacing $D_R$ between the innermost portions of the apparatus with the holding mechanisms retracted and greater than the spacing $D_E$ obtained with the holding mechanisms fully extended. Although not preferred, the holding mechanisms may comprise only fixed or manually adjustable stand-off contacts that do not provide any significant degree of extension or retraction during use. As further illustrated in FIGS. 3A and 3B, a carrier 72 is disposed at least partially within the frame 68 and configured for movement along an arcuate path defined by the frame. The carrier also mounts at least one, and preferably at least two, sensor assemblies 74 that will permit the placement of the sensing portion of the sensor assembly within sufficient proximity to portions of the surface of the object being inspected.

Much of the gross positioning of the frame is achieved by manipulating the support 64 with appropriate mechanisms (not shown). As illustrated in FIGS. 4A and 4B, it is preferable that the mechanisms permit the support to be moved in a controllable fashion and provide for rotation of the frame generally about the longitudinal axis of the support as well as provide for translational movement in the x, y and z directions. Further, as illustrated in FIG. 4A, in the preferred embodiment of the present invention, the connector 66 allows for the controlled rotational or swinging movement of the frame about a generally horizontal axis substantially perpendicular to the longitudinal axis of the support to achieve a deflected position. As will be appreciated by those of ordinary skill, a variety of mechanisms and configurations may be used to achieve a connector assembly that provides this range of motion. One preferred configuration incorporates two motors into the connector assembly with one motor driving the circumferential movement of the carrier and the other driving the angular displacement of the frame relative to the support. Various types of gearing, locks, and position controllers may also be incorporated into the connector assembly as desired. This range of motion allows the orientation of the frame to be adjusted as necessary to allow it to be more easily moved into a scanning position and improve the utility of the apparatus in crowded or otherwise obstructed environments such as found in a RPV.

As illustrated in FIGS. 5A and 5B, the carrier 72 is preferably arranged and configured within the frame 68 to provide for controlled movement of at least about 90 degrees along the frame in both a clockwise, FIG. 5A, and counterclockwise, FIG. 5B, direction. This range of motion, with the sensor assemblies 74 positioned near the ends of the carrier, allows for a substantially complete scan of a portion of a circumferential surface region from a single frame position. Preferably, the positioning of the sensor assemblies, in combination with the movement of the carrier within a properly positioned and fixed frame, allows for a series of overlapping scan paths to ensure complete coverage of at least one circumferential area without having to reposition the frame.

As illustrated in FIGS. 6A–6D, a wide range of holding mechanisms 70 may be successfully employed for the purpose of temporarily fixing the orientation of the frame 68 with respect to the object being scanned for the duration of the scan. As illustrated in FIG. 6A, a basic holding mechanism can comprise a pad 76 provided on a hydraulic or pneumatic piston 78 that is moved forward to contact the object being scanned with sufficient pressure to maintain the relative orientation of the frame. Although hydraulic or pneumatic action is preferred, those of ordinary skill will appreciate that there are a wide range of mechanisms that could be used successfully to move a portion of the holding mechanism into and out of contact with the object being scanned.

In a preferred embodiment, at least two holding mechanisms are employed to center the object being scanned within the arc of the frame and maintain that position for the duration of the scan. Depending on the nature of the object being scanned and the holding force necessary, alternative holding mechanisms such as a vacuum or suction pad 80 may be extended to seal against the object being scanned while withdrawing fluid from the interior of the pad to produce a pressure differential sufficient to hold the frame in place. If the object being scanned is ferrous, a magnetic pad 82, either permanent or electromagnetic, can be used to maintain the position of the frame. In addition to the basic contact member 76, 80, 82, the holding mechanism may also be provided with one or more positioner rods 84 that can assist in the positioning of the frame relative to the object being scanned as the frame is moved into a scanning position or in separation of the frame from the object after the scan has been completed, e.g., break the suction or magnetic contact. It is also possible to utilize a combination of generally static holding mechanisms, such as stand-offs and adjustable stand-offs, in combination with mobile holding mechanisms, such as pneumatic pistons, to achieve the desired positioning of the frame around the cylindrical object being scanned.

Figures 7A, 7B, 7C:
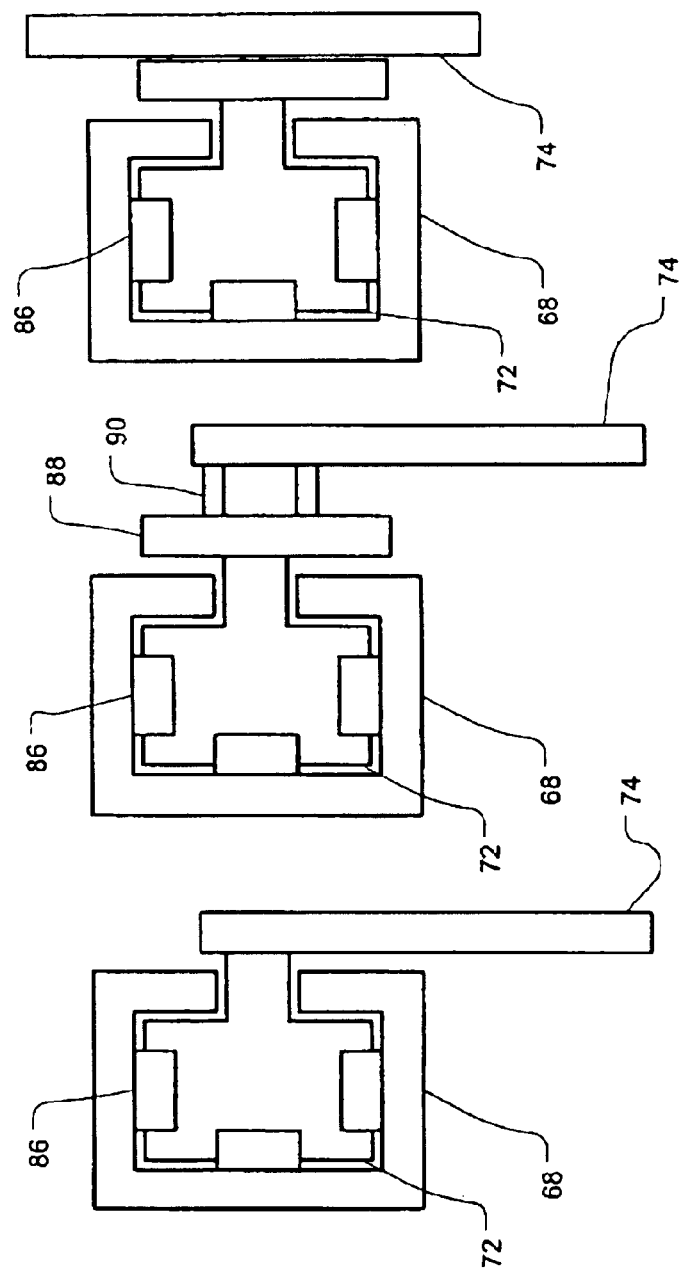
FIGS. 7A–7C illustrate some alternative configurations for the frame, carrier and sensor assembly.

As illustrated in FIGS. 7A–7C, the carrier 72 may be arranged largely within the frame 68 and moveably supported therein by a series of rollers 86. In a preferred embodiment, a sensor assembly 74 is provided at both ends of the carrier. In a more preferred embodiment, FIGS. 7B–7C, the sensor assembly includes a mechanism 88, 90 that allows for the controlled positioning of the sensor portion of the sensor assembly relative to the frame.

As illustrated in FIGS. 8A–8B, in another preferred embodiment, the sensor array includes a mechanism 92 that provides for controlled movement of the sensor portion of the sensor assembly relative to the frame and includes a protected position, FIG. 8A, for minimizing the risk of damage to the sensor portion during movement of the frame and a scanning position, FIG. 8B, for exposing the sensor portion, preferably after the frame position has been fixed relative to the object being scanned.

Figures 9A, 9B, 9C:
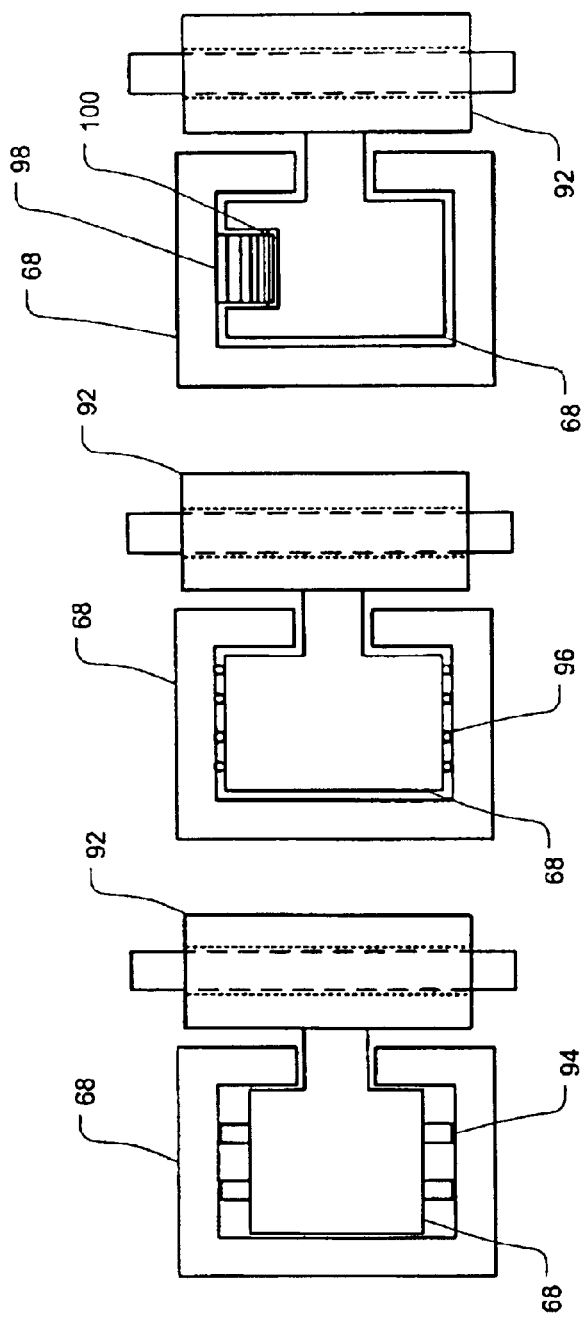
FIGS. 9A–9C illustrate some alternative configurations for the frame and carrier.

As illustrated in FIGS. 9A–9C, the carrier 72 may be supported with-in within the frame 68 using one or more of a variety of mechanisms including wheels or glides provided on the frame or the carrier, FIG. 8A, and ball or roller bearings, FIG. 8B. Similarly, the mechanism used to move the carrier relative to the frame can include a rack and pinion assembly as illustrated in FIG. 8C. As will be appreciated by one of ordinary skill in the art, numerous mechanisms and configurations may be successfully employed for moving the carrier relative to the frame. Indeed, even with the basic rack and pinion configuration, the pinion gear and motor can be provided in either a fixed configuration, mounted on the frame, or a mobile configuration, mounted on the carrier, and interacting with a rack provided on the other component.

Figures 10A, 10B:
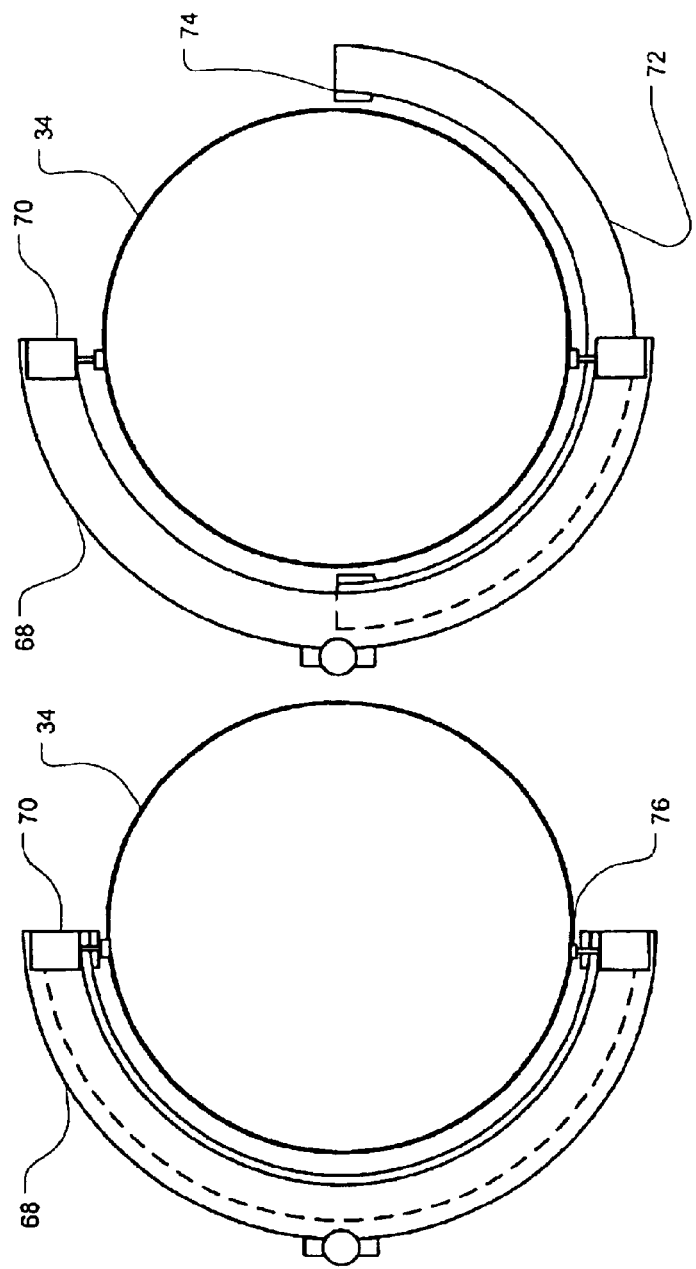
FIGS. 10A and 10B illustrate the orientation of the frame and carrier during the attachment step and the measuring step for a preferred embodiment of the invention.

As illustrated in FIGS. 10A–10B, the basic scanning procedure comprises the steps of manipulating the frame 68 using the support 64 and the connector 66 to position the frame about a cylindrical object such as a jet pump diffuser tailpipe. Once the frame is in the desired position, e.g., near the bottom of the jet pump diffuser tailpipe, above the jet pump adapter and generally perpendicular to the longitudinal axis of the jet pump diffuser, the holding mechanisms 70 are engaged to press pads 76 or other structures against the jet pump diffuser to fix the position of the frame in preparation for the scanning process as illustrated in FIG. 10A. Preferably, the holding mechanisms include or cooperate with another mechanism or sensor to ensure that the object being scanned is generally centered within the frame, e.g., within the adjustment tolerance provided by the sensor assembly.

The sensor portion, including the sensor head, of the sensor assembly 74 is then moved into close proximity, i.e., within a target separation distance, of the weld or other portion of the object to be scanned. Once the sensor portion is properly positioned, the carrier is moved relative to the frame to move the sensor portion along a circumferential surface portion of the object being scanned. It is preferred that the range of carrier movement extend at least about 90° in both the clockwise and counter-clockwise direction from the original carrier position. An approximately 90° counter-clockwise carrier motion is illustrated in FIG. 10B. In this manner, with two sensor arrays provided at opposite ends of the carrier, the entire circumference of the object may be scanned without repositioning the frame.

Figures 11A, 11B, 11C:
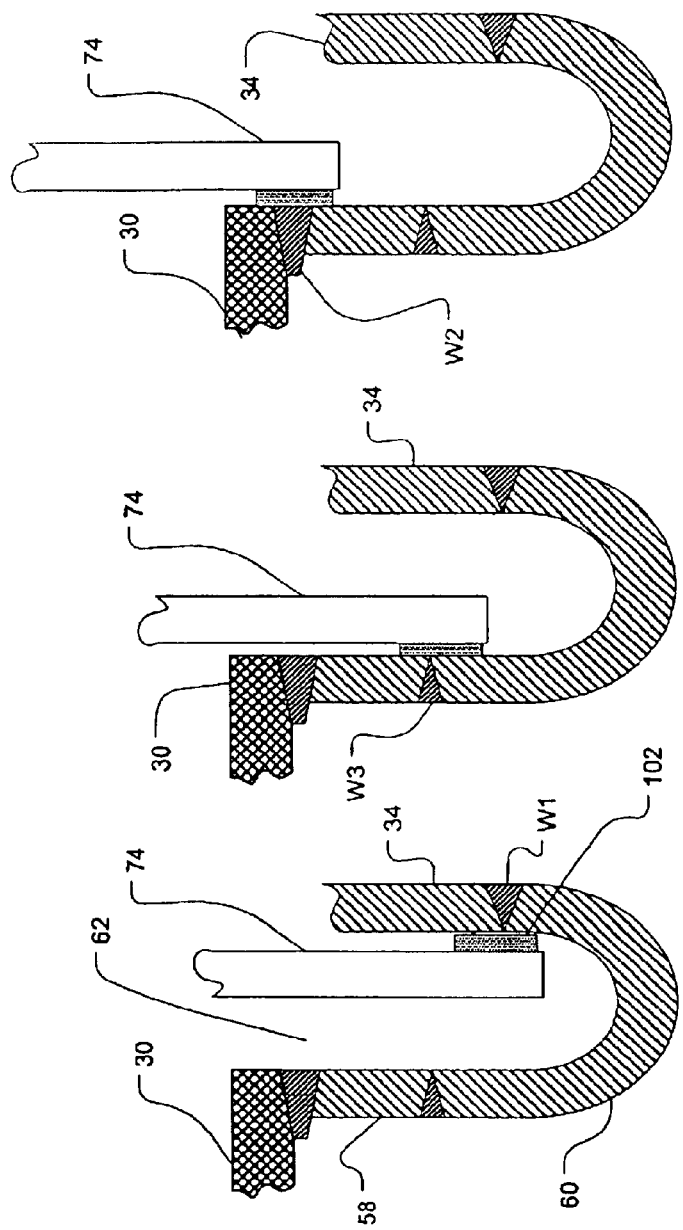
FIGS. 11A–11C illustrate the changes in orientation of the sensor head during the examination of a series of welds within a single recessed annular region.

Turning to the welds illustrated in FIG. 2, in order to examine the obstructed carrier plate, jet pump, jet pump adapter welds, at least the sensor portion, including the sensor head 102, of the sensor assembly 74 must be capable of extending into the annular region 62 and selectively positioning the sensor head adjacent each of the welds as illustrated in FIGS. 11A–11C. The sensor assembly preferably provides for the rotation of the sensor portion (illustrated in FIGS. 11A–11B) to permit scanning of surfaces on both sides of the annular region. Alternatively, front and rear sensor portions can be provided on a non-rotating sensor assembly or the apparatus can be removed from the RPV and the sensor arrays selectively reconfigured for the scanning of interior or exterior surfaces along the annular region. The movement and positioning of the sensor assembly 74 and sensor head 102 are determined by a controller. The sensor head 102 may comprise one or more devices including ultrasonic transducers, an array of eddy current sensors, or any other desired non-destructive measurement device. As the sensor head 102 is moved alone the surface being scanned, the sensor generates a signal corresponding to a value of a property of the material forming the surface being scanned. The signal generated by the sensor is transmitted to a receiver so that the property of the surface may be analyzed. When an array of sensors are used, the need to adjust the location of the sensor assembly can be minimized.

Figures 12A, 12B, 12C:
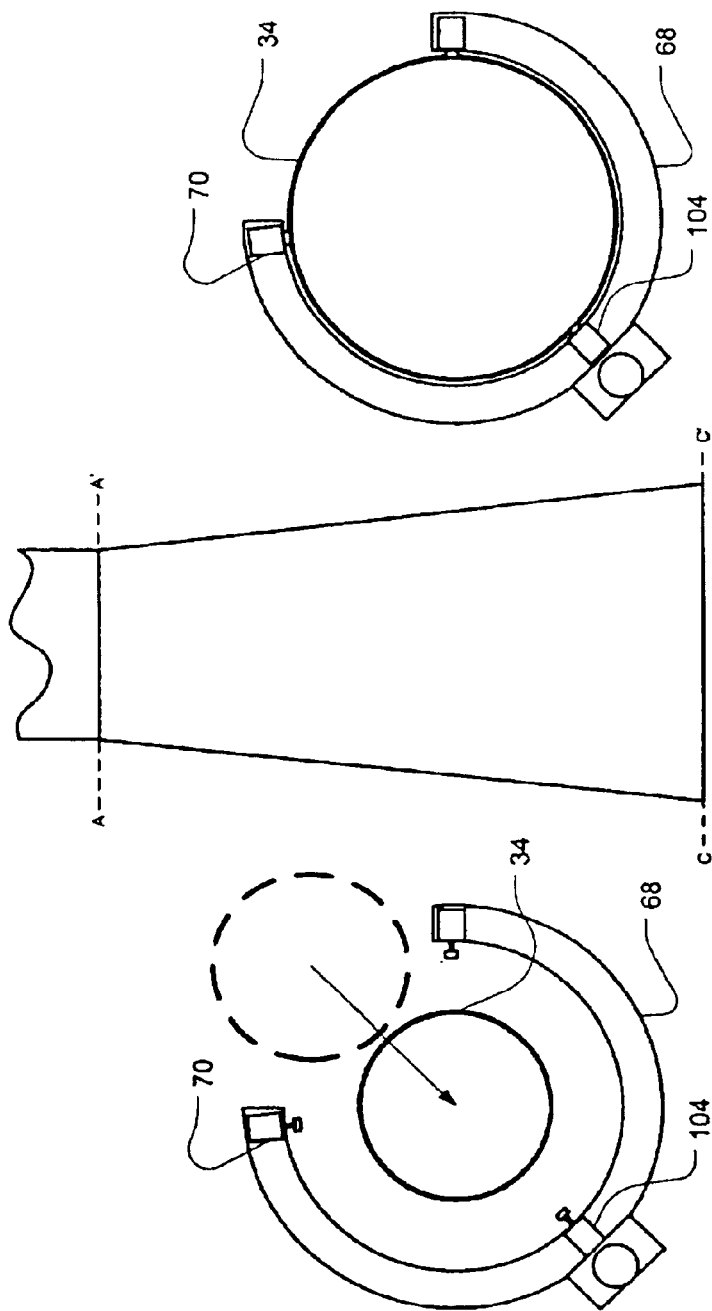
FIGS. 12A–12C illustrate a preferred embodiment of the frame and holding mechanisms for the apparatus according to the present invention in connection with a flared structure.
Figure 14:
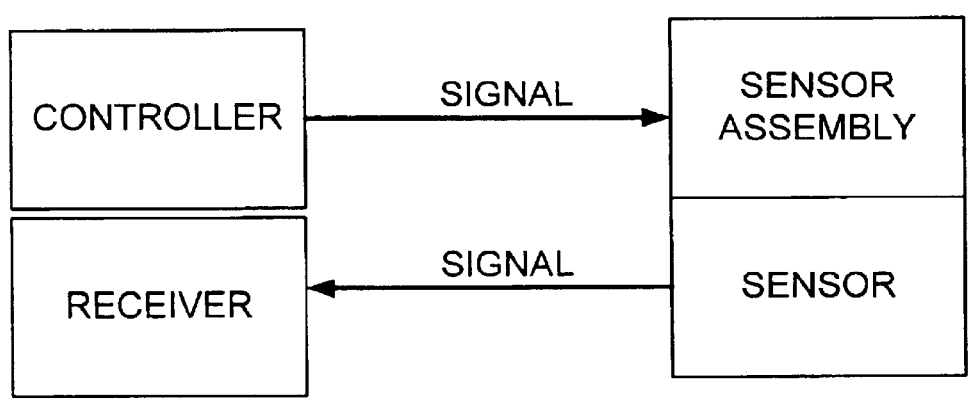
FIG. 14 illustrates the relationship between the controller, sensor assembly, sensor and receiver.

As illustrated in FIGS. 12A and 12C, in a preferred embodiment of the apparatus, the frame extends through an arc of more than 180 degrees and preferably provides for at least three points of contact with the object being scanned. This configuration is particularly suited for affixing the apparatus to a flaring structure FIG. 12B, such as a jet pump diffuser, whereby the apparatus can be placed around a smaller diameter portion of the structure A–A' and then raised or, more typically lowered toward a larger diameter portion C–C' of the structure. By positioning at least two holding mechanisms 74 more than +/−90 degrees from the support 64, they can cooperate with a third holding mechanism and/or stand-off structure 104 to accurately center the structure within the frame.

In order to accommodate structures that do not have both a narrow portion away from the area of interest and a flared region at or near the area of interest, alternative frame designs can be utilized to provide a sufficiently large opening while still allowing the holding mechanisms to be positioned more than +/−90 degrees from the support. The function of one such alternative is illustrated in FIGS. 13A and 13B. The illustrated arrangement allows one or both of the end portions 106 of the frame to be opened by, for instance hydraulic pistons, and thereby provide a larger effective opening distance as illustrated in FIG. 13A. Although it is preferred that the carrier 72, when centered in the frame 68 relative to the support 64, not extend into either of the end portions 106 of the frame, the alternatives are not so limited. Indeed, depending on the configuration of the frame and carrier, the carrier may extend into one or both of the end portions provided that the carrier is mounted in such a way as to prevent mechanical interference with the moving portions of the frame. Once the frame has been moved to a position surrounding the structure, the end portions may be returned to their home position to complete the arcuate path that will be utilized by the carrier during the measurement procedures as illustrated in FIG. 13B. The holding mechanisms and/or stand-off structures can then engage to center the structure and establish a stable scanning position.

The above described apparatus and method provides for reliable and substantially complete examination of a plurality of circumferential welds W1, W2 and W3 located within the narrow annular space defined by a jet pump diffuser and jet pump adapter. Although discussed with reference to the jet pump diffuser tailpipe jet pump adapter junctions, this apparatus and method of the present invention may also be adapted for the examination of other similarly obstructed welds and surfaces.

While the invention has been described and illustrated in terms of various specific embodiments, those skilled in the art will recognize that particularly the apparatus of the present invention may be modified in many respects without departing from the spirit and scope of the following claims.

What is claimed is:

1. An apparatus for inspecting an obstructed circumferential portion of a generally cylindrical object comprising:
   a substantially vertical support;
   a generally arcuate frame defining an opening;
   a holding mechanism arranged on the frame for engaging a surface of the generally cylindrical object, thereby temporarily fixing the position of the frame adjacent the generally cylindrical object;
   a connector, the connector arranged between a lower portion of the support and the frame, the connector allowing for pivotal movement of the frame about the support;
   a carrier, the carrier being supported by the frame and moveable along a portion of the arc described by the frame; and
   a sensor assembly arranged on the carrier and positioned adjacent a surface of the cylindrical object, the sensor assembly comprising a sensor head,
   whereby movement of the carrier causes the sensor head to move over an arcuate portion of a surface of the cylindrical object.

2. An apparatus for inspecting an obstructed circumferential portion of a generally cylindrical object according to claim 1, wherein:
   the holding mechanism for temporarily fixing the position of the frame adjacent a generally cylindrical object is selected from a group consisting of:
   first and second stand-off elements of substantially fixed length and orientation arranged so that contact between the stand-off elements and a surface of the cylindrical object cooperate to establish a generally coaxial orientation of the frame relative to the cylindrical object;
   first and second adjustable stand-off elements wherein the length of the adjustable stand-off elements may be manually adjusted between a minimum length and a maximum length and are arranged so that contact between the adjustable stand-off elements and a surface of the cylindrical object cooperate to establish a generally coaxial orientation of the frame relative to the cylindrical object;
   first and second piston elements arranged and configured to extend first and second pads to contact the surface of the cylindrical object, the piston elements being arranged so that compressive forces applied by the extended pads against a surface of the cylindrical object cooperate to establish a generally coaxial orientation of the frame relative to the cylindrical object,
   first and second magnetic elements arranged and configured to extend first and second magnets to engage a ferrous surface of the cylindrical object, the magnetic elements being arranged and configured so that magnetic forces established between the extended magnets cooperate to establish a generally coaxial orientation of the frame relative to the cylindrical object, and
   first and second vacuum elements arranged and configured to extend first and second vacuum elements to engage a surface of the cylindrical object, the vacuum elements being arranged and configured so that the pressure differential established between the extended vacuum elements and a surface of the cylindrical object cooperate to establish a generally coaxial orientation of the frame relative to the cylindrical object.

3. An apparatus for inspecting an obstructed circumferential portion of a generally cylindrical object according to claim 1, wherein the sensor assembly further comprises:
   a sensor actuator, the sensor actuator arranged and configured for fine movement of the sensor head relative to the carrier, the range of movement being sufficient to compensate for variations in positioning the carrier relative to the surface of the cylindrical object and thereby achieve a desired orientation of the sensor head and the surface of the cylindrical object.

4. An apparatus for inspecting an obstructed circumferential portion of a generally cylindrical object according to claim 1, wherein:
   the frame and the carrier are characterized by generally similar arcuate lengths;
   the carrier being arranged and configured for movement between a first position and a second position relative to the frame, and further wherein
   in moving to the first position, a first end portion of the carrier moves in a generally arcuate path that extends substantially beyond a corresponding first end of the frame and
   in moving to the second position, a second end portion of the carrier moves in a generally arcuate path that extends substantially beyond a corresponding second end of the frame.

5. An apparatus for inspecting an obstructed circumferential portion of a generally cylindrical object according to claim 4, wherein:

a first sensor is arranged adjacent the first end portion of the carrier and a second sensor is arranged adjacent the second end portion of the carrier; and further wherein the first sensor tracks across a first scanned portion of the surface of the cylindrical object as the carrier moves between the first position and the second position and the second sensor tracks across a second scanned portion of the surface of the cylindrical object as the carrier moved between the first position and the second position.

6. An apparatus for inspecting an obstructed circumferential portion of a generally cylindrical object according to claim 5, wherein:

the first scanned portion comprises at least about 180° of the surface of the cylindrical object and the second scanned portion comprises at least about 180° of the surface of the cylindrical object, whereby the combination of the first and second scanned portions substantially defines a single annular portion of the surface of the cylindrical object.

7. An apparatus for inspecting an obstructed circumferential portion of a generally cylindrical object according to claim 1, wherein:

the obstructed circumferential portion of the cylindrical object comprises an annular recess, the recess having an inner surface and an outer surface and being characterized by a depth to width ratio of at least 4; and the sensor head is positioned adjacent a scanned surface within the recess during the arcuate movement of the carrier, the relative position of the sensor head and the scanned surface being characterized by a target separation distance.

8. An apparatus for inspecting an obstructed circumferential portion of a generally cylindrical object according to claim 7, wherein:

the sensor assembly being capable of adjusting the position of the sensor head relative to the carrier during carrier movement to maintain the target separation distance within predetermined limits.

9. An apparatus for inspecting an obstructed circumferential portion of a generally cylindrical object according to claim 8, further comprising:

a controller for automatically adjusting the position of the sensor head relative to the carrier during carrier movement to maintain the target separation distance within predetermined limits.

10. An apparatus for inspecting an obstructed circumferential portion of a generally cylindrical object according to claim 3, further comprising:

a sensor actuator, the sensor actuator arranged and configured for gross movement of the sensor relative to the carrier, the range of movement being sufficient to position the sensor adjacent two distinct circumferential portions of the surface of the cylindrical object without requiring any repositioning of the frame.

11. An apparatus for inspecting an obstructed circumferential portion of a generally cylindrical object according to claim 1, further comprising:

first and second frame end portions, the frame end portions being moveable with respect to an arcuate base frame portion, the frame end portions being moveable between a first position that defines a maximum width of the opening and a second position that extends the arcuate path defined by the arcuate base frame portion.

12. A method of inspecting an obstructed circumferential portion of a generally cylindrical object using an apparatus comprising a support, a generally arcuate frame, a holding mechanism for temporarily fixing the frame to the generally cylindrical object, a connector, a carrier supported by the frame, and a sensor assembly comprising a sensor arranged on the carrier, the method comprising the steps of:

orienting a longitudinal axis of the support generally parallel to a longitudinal axis of the cylindrical object;

positioning the frame and carrier for movement;

positioning the support so that a lower portion of the support is generally perpendicular to a portion of the generally cylindrical object to be scanned;

positioning the frame in a measurement orientation in which the frame is generally perpendicular to the support and partially surrounds a portion of the generally cylindrical object;

engaging the holding mechanism to contact a portion of a surface of the generally cylindrical object and thereby establish a first position of the frame relative to and partially surrounding the generally cylindrical object;

positioning the sensor adjacent an obstructed portion of the generally cylindrical object, wherein the obstructed portion may not be surrounded by any portion of the frame;

moving the carrier in a generally arcuate path, thereby moving the sensor along a circumferential portion of the obstructed portion of the generally cylindrical object to define a scanned surface portion; and sensing a property of the generally cylindrical object adjacent the scanned surface portion.

13. A method of inspecting an obstructed circumferential portion of a generally cylindrical object according to claim 12, further comprising the steps of:

releasing the holding mechanism; and removing the apparatus from the vicinity of the generally cylindrical object.

14. A method of inspecting an obstructed circumferential portion of a generally cylindrical object according to claim 12, further comprising the steps of:

releasing the holding mechanism;

repositioning the frame relative to the generally cylindrical object; and re-engaging the holding mechanism to contact a second portion of a surface of the generally cylindrical object and thereby establish a second position of the frame relative to the generally cylindrical object.

15. A method of inspecting an obstructed circumferential portion of a generally cylindrical object according to claim 12, further comprising the steps of:

generating a signal corresponding to a value of the property being sensed; and communicating the signal to a receiver.

16. A method of inspecting an obstructed circumferential portion of a generally cylindrical object according to claim 12, wherein the step of moving the carrier in a generally arcuate path further comprises the steps of:

positioning the carrier at an initial position within the frame, the initial position being one in which the carrier is positioned substantially within frame;

moving the carrier at least about 90° along the arcuate path in a first direction, the movement terminating at a first extended position; and moving the carrier at least about 180° along the arcuate path in a second direction, the second direction being the direction opposite the first direction, the movement terminating at a second extended position.

17. A method of inspecting an obstructed circumferential portion of a generally cylindrical object according to claim 16, wherein the step of moving the carrier in a generally arcuate path further comprises the step of:

moving the carrier at least about 90° along the arcuate path in a first direction, the movement terminating with the carrier in approximately the initial position.

18. A method of inspecting an obstructed circumferential portion of a generally cylindrical object according to claim 12, wherein the step of preparing the frame and carrier for movement further comprises the steps of:

positioning the carrier at an initial position, the initial position being one in which the carrier is positioned substantially within the frame; and positioning the frame at a deflected position relative to the support, the deflected position reducing an effective width of the frame in a direction perpendicular to a longitudinal axis of the support.

19. A method of inspecting an obstructed circumferential portion of a generally cylindrical object according to claim 18, wherein the step of preparing the frame and carrier for movement further comprises the step of:

positioning the sensor heads in a protected orientation to reduce the likelihood of contact with an obstruction during steps of positioning the support and positioning the frame.

20. A method of inspecting an obstructed circumferential portion of a generally cylindrical object using an apparatus comprising a support, a generally arcuate frame comprising a base portion and first and second end portions, a holding mechanism for temporarily fixing the frame to the generally cylindrical object, a connector, a carrier supported by the frame, and a sensor assembly comprising a sensor arranged on the carrier, the method comprising the steps of:

orienting a longitudinal axis of the support generally parallel to a longitudinal axis of the cylindrical object;

positioning the frame and carrier for movement, wherein the frame end portions are moved relative to the frame base portion to form an enlarged opening;

positioning the support so that a lower portion of the support is generally perpendicular to a portion of the generally cylindrical object to be scanned;

positioning the frame in a measurement orientation in which the frame is generally perpendicular to the support and partially surrounds a portion of the generally cylindrical object, and further wherein the frame end portions are moved relative to the frame base portion to reduce the enlarged opening and complete the arcuate frame;

engaging the holding mechanism to establish a first position of the frame relative to the generally cylindrical object;

positioning the sensor adjacent an obstructed portion of the generally cylindrical object;

moving the carrier in a generally arcuate path, thereby moving the sensor along a circumferential portion of the obstructed portion of the generally cylindrical object to define a scanned surface portion; and sensing a property of the generally cylindrical object adjacent the scanned surface portion.

* * * * *